United States Patent [19]

Stein

[11] Patent Number: 4,679,597

[45] Date of Patent: Jul. 14, 1987

[54] LIQUID PULSATION DAMPENING DEVICE

[75] Inventor: John Stein, Spokane, Wash.

[73] Assignee: Kim Hotstart Mfg. Co., Inc., Spokane, Wash.

[21] Appl. No.: 811,646

[22] Filed: Dec. 20, 1985

[51] Int. Cl.$^4$ .............................................. F16L 55/02
[52] U.S. Cl. ...................................... 138/26; 181/280
[58] Field of Search ...................... 138/26, 37, 39, 42; 165/53, 69, 138; 181/206, 233, 279, 280; 417/312

[56] References Cited

U.S. PATENT DOCUMENTS

| | | | |
|---|---|---|---|
| 1,157,256 | 10/1915 | Schmitt | 181/280 |
| 2,851,058 | 9/1958 | Rumsey | 138/26 |
| 3,148,745 | 9/1964 | Jones | 181/233 |
| 3,385,396 | 5/1968 | Morris | 181/233 |
| 3,523,557 | 8/1970 | Colter | 138/37 |

FOREIGN PATENT DOCUMENTS

| | | | |
|---|---|---|---|
| 25901 | of 1906 | United Kingdom | 181/280 |
| 334717 | 9/1930 | United Kingdom | 181/280 |
| 345895 | 4/1931 | United Kingdom | 181/280 |

OTHER PUBLICATIONS

Kim Hotstart Bulletin CH-100, "Engine Pre-Heaters and Accessories", p. 11.
Kim Hotstart Bulletin CH-300, "Industrial Engine Pre-Heaters", p. 22.

Primary Examiner—Stephen Marcus
Assistant Examiner—Mark Thronson
Attorney, Agent, or Firm—Wells, St. John & Roberts

[57] ABSTRACT

A liquid pulsation dampening device comprises a sound transmitting tube structure, including a helical fin that causes incoming pulsations within a liquid to first traverse a spiral path. Vibrations and pulsations transmitted through the liquid are transferred to the tube and are effectively cancelled during their subsequent reverse axial movement through the tube interior. The housing includes a port leading between the housing and tube. One end wall includes a port leading to the tube interior. Passages are provided at the opposite end of the device for free-flow of liquid between the space separating the housing and tube and the tube interior.

14 Claims, 8 Drawing Figures

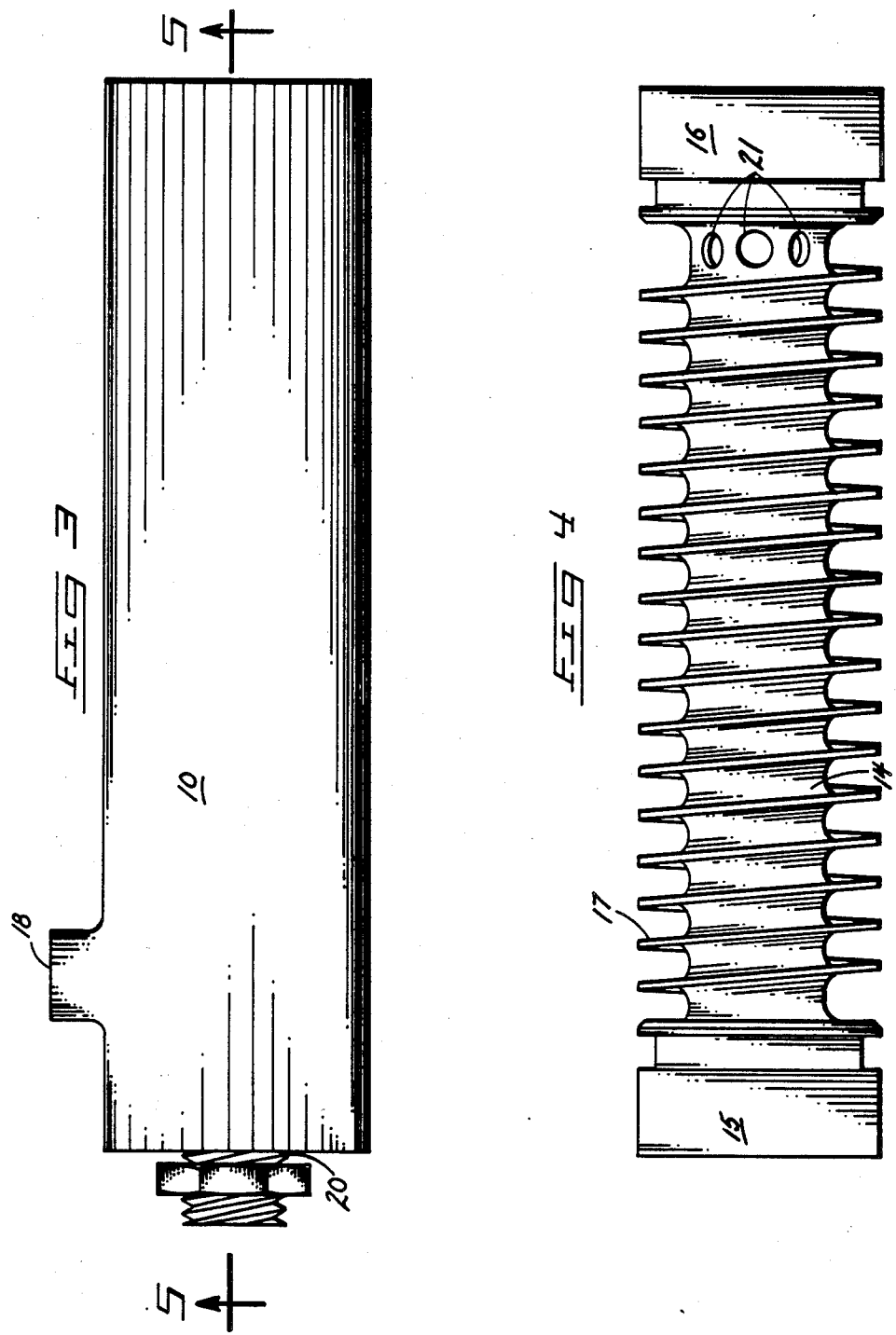

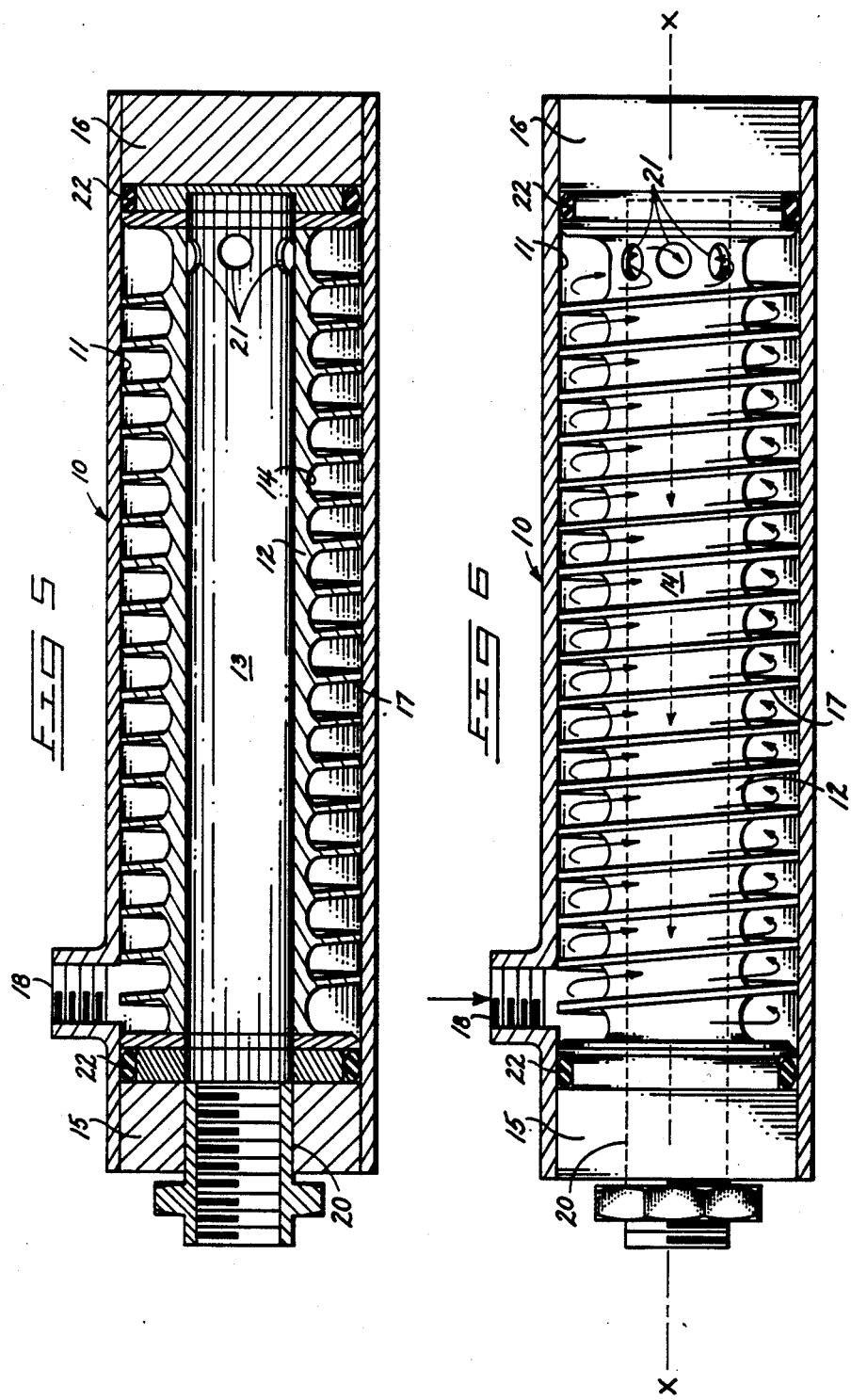

ary pump for circulating the liquid, The operation of a pump might introduce undesirable pulsations to the circulated liquid which, in the case of a submarine, might be detected from the exterior of the vessel.

LIQUID PULSATION DAMPENING DEVICE

FIELD OF THE INVENTION

This disclosure relates to an apparatus for dampening pulsations transmitted through a circulating pressurized liquid, such as pulsations created by pump operation.

BACKGROUND OF THE INVENTION

This invention arose from efforts to meet user requirements in the application of heat exchanger systems to naval requirements, particularly with respect to installations on submarines. Heat exchangers are used for maintaining equipment in readiness for operation by warming liquid coolants, lubricating fluids, or fuel while an engine or other equipment is not operational. Such heat exhangers typically require utilization of an auxiliary pump for circulating the liquid, The operation of a pump might introduce undesirable pulsations to the circulated liquid which, in the case of a submarine, might be detected from the exterior of the vessel.

There are many other applications where liquid pulsations in a circulating system are undesirable or harmful. Liquid systems that include quick opening or closing valves also are subjected to pulsations which can be very severe, such as in water supply systems subjected to "water hammer". These pulsations, which travel substantially unimpeded throughout the entire liquid sytsem because of the inherent non-compressible nature of a liquid, can sometimes result in structural damage to the liquid system and attached structures.

The development of this system arose from the analogy between electronic circuits and liquid systems. It is well known in electronics that selected frequencies can be filtered by use of a coil and a capacitance wired parallel to one another through a common junction. In attempting to produce a simialr effect in a liquid system, a coil-like liquid path and a straight liquid path were combined along a common sound transmitting member. Because of its ready availability, an existing heat exchanger was modified both structurally and operationally during experimental development of the device. The available heat exchanger was utilized because it included a helical liquid path having relatively low back pressure. It has been found by further experimentation that the resulting apparatus produces new and unexpected reductions in pulsation amplitude through the liquid system over a wide range of monitored frequencies.

BRIEF DESCRIPTION OF THE DRAWINGS

The invention is illustrated in the accompanying drawings, in which:

FIG. 3 is a side elevation view of the device;

FIG. 4 is a side elevation view of the hollow tube element;

FIG. 5 is a sectional view through the device along line 5—5 in FIG. 2;

FIG. 6 is a sectional view through the housing, illustrating flow of liquid through the device;

DETAILED DESCRIPTION OF THE PREFERRED EMBODIMENT

Figure 1:
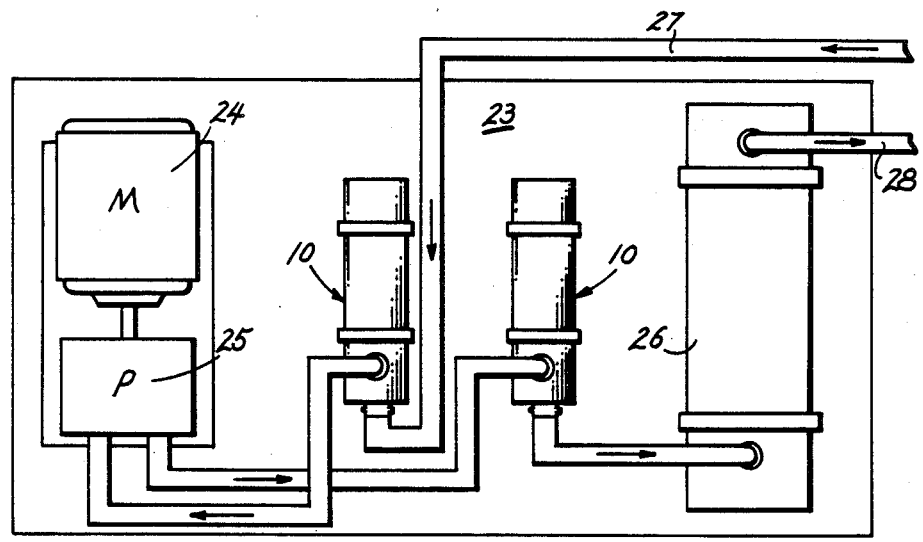
FIG. 1 is a schematic plan view of a heat exchanger system including the present device.
Figure 2:
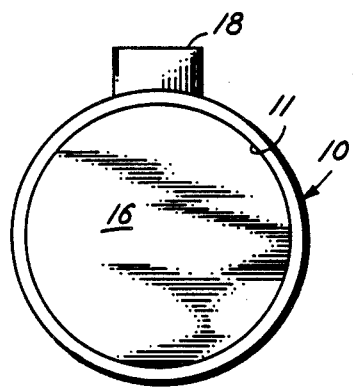
FIG. 2 is an end view of the device.

In compliance with the constitutional purpose of the Patent Laws "to promote the progress of science and useful arts" (Article 1, Section 8), applicant submits the following disclosure of the invention.

This disclosure relates to a liquid pulsation dampening device for reducing the amplitude of pulsations imparted to a circulating liquid by pumps, valves or other equipment through which the liquid is routed. Unlike gaseous transmission systems, where pulsations are varied through the system due to the compressibility of a gaseous medium, pulsations in a liquid system travel throughout the system essentially unmodified. Because liquids are not compressible, vibrations and pulsations imparted to a confined liquid travel essentially unimpeded through the system in continuous waves.

The details of pulsation theory involve superimposed steady and alternating fluid flows which are very complex and not well understood. However, the results of pulsation within a confined liquid transmission system are well known. The transmission structure, including the tubing or piping through which the liquid flows, can be permanently damaged by pulsation-induced failures. The efficiency of the fluid transmission system is also decreased because of the increased turbulence within the confined system. In some situations, precise determination of pressures within a system is impaired because of the presence of pulses superimposed upon the steady state flow of liquid.

According to this invention, liquid pulsations emanating from a source, such as a pump, are dampened by directing the pulsations about an elongated helical path over the exterior of a tubular element having substantial sound transmitting capabilities, and subsequently reversing their longitudinal direction in a reverse direction through the interior of the tubular element in an axial path. The tubular element is subjected to direct contact with liquid pulsations while the liquid is traveling in reverse directions through first a helical path and then a straight line path. The resulting vibrations transmitted to the tubular element tend to cancel out one another in a manner similar to the combined operation of a coil and capacitance wired in parallel in an electronic filter.

FIGS. 2–6 show details of one form of the invention which has been used successfully for dampening liquid pulsations in a pressurized liquid transmitting system. The device, which is enclosed within an exterior cylindrical housing 10, is schematically illustrated within a liquid heat exchanger system in FIG. 1 for illustration purposes only. In the heat exchanger system, which might be used for warming lubrication fluids or other fluids in a machine or engine (not shown) during standby conditions, liquid is received from the machine or engine through a return hose 27, warmed in a heat exchanger 26, and directed back to the machine or engine through a supply hose 28. A pump 25 is driven by a motor 24 to circulate liquid between the return hose 27 and supply hose 28 while directing the liquid through heat exchanger 26. Heat exchanger 26 might be electrically warmed to maintain the desired temperature of the circulated liquid within the machine or engine while it is in a standby condition.

The present device is shown interposed between return hose 27 and the inlet of pump 25 and between the outlet of pump 25 and the inlet of heat exchanger 26.

The two identical devices suppress pulsations imparted to the liquid by operation of pump 25 at both its inlet and outlet connections. In this way, the closed liquid circulation system is isolated from the liquid pulsations inherent to operation of conventional positive displacement pumps of various designs.

It is to be noted from FIG. 1 that the flow of fluid is reversed in the two illustrated devices shown in housing 10. They are properly arranged in relation to pump 25 to dampen pulsations emanating from its conventional operation. These pulsations, which travel outwardly from pump 25, are first directed about a helical path and then reversed along an axial path, as described below. However, the flowing liquid in the two hoses connected to pump 25 travels in opposite paths within the two devices.

The liquid pulsation dampening device is not specific to any form of pressurized liquid circulation system, pump, valve, or other source of liquid pulsations. No further description of its general operational environment is believed necessary in order to provide a background for understanding the structure and operation of the device itself.

The housing 10 has a continuous cylindrical inner wall surface 11 formed about a central longitudinal axis indicated by line X—X in FIG. 6. It encloses a central coaxial hollow tube 12, having a cylindrical inner surface 13 and a generally cylindrical outer surface 14. The hollow tube 12 is longitudinally positioned within housing 10 with its inner and outer surfaces 13 and 14 generally extending from one end of housing 10 to the other.

The tube 12 terminates at two transverse end walls 15 and 16 sealed across the cylindrical inner wall 11 of housing 10. The end walls 15 and 16 are located at positions spaced longitudinally apart from one another along the central axis X—X. In this manner, the two transverse end walls 15 and 16 seal across inner wall surface 11 of housing 10 and close off the respective ends of tube 12.

A continuous helical fin 17 is formed integrally about the outer surface of tube 12. Fin 17 extends radially outward from the outer cylindrical surface 14 of tube 12 to the inner wall surface 11 of housing 10. It is immaterial to the dampening function of the device whether there is direct engagement between fin 17 and housing 10, but the outer diameter of fin 17 should closely approximate the diameter of inner wall surface 11 so as to substantially restrict flow of liquid across the fin structure.

A first port 18 is provided for pressurized liquid leading to the space between the cylindrical inner wall surface of the housing and the outer surface 14 of the tube 12. The threaded port 18 is formed radially through housing 10 at a location inwardly adjacent to end wall 15. A second port 20 is also provided for the pressurized liquid, and leads into the interior of hollow tube 12. The threaded port 20 is formed axially through end wall 15.

Passage means longitudinally spaced along axis X—X from the ports 18 and 20 for transferring liquid between the space separating the cylindrical inner wall surface 13 and the outer surface 14 and the interior of the hollow tube 12 is shown as a series of apertures 21. The apertures 21 extend through tube 12 and are arranged angularly about the axis X—X.

The end walls 15 and 16 are each provided with resilient peripheral seals 22 for confining liquid within the housing 10. Any suitable seal can be used in place of the resilient O-rings illustrated in the drawings.

As shown by the arrows in FIG. 6, the flow of liquid received from a source of pulsations is directed through the device by first traversing a spiral path leading from port 18 adjacent to end wall 15, as the liquid moves in contact with tube 12 in a first longitudinal direction through housing 10 along the helical fin 17. The liquid then passes through apertures 21, which are located inwardly adjacent to end wall 16 at the opposite end of housing 10. Further liquid flow causes the liquid to traverse an axial path in contact with the inner surface 13 of tube 12 as it moves in a reverse longitudinal direction through the housing 10. the free-flowing liquid is then discharged through port 20 formed through end wall 15. It is understood that the flow of liquid directed to a source of pulsations will be opposite to that shown by the arrows in FIG. 6. The liquid will then enter at port 20, flow axially to apertures 21, traverse the helical path, and exit from port 18.

The tube 12 and integral fin 17 must be made from a metal having substantial sound transmitting capability. This metal must be capable of transmitting sound through a wide range of audible and inaudible frequencies at a rate of velocity without major obstruction. Typical sound tranmsitting materials of this type are aluminum, titanium, steel alloys, and harder alloy metals. The vibrations that result from liquid pulsations must be transmitted through the tube 12 and fin 17 without substantial distortion in order that the pulsations can effectively negate one another during the reversing helical and axial flow of liquid. It is the transmission of such vibrations to the tube 12 during the two different reversed flow conditions that dampens the remaining pulsations in the liquid as it exits through opening 20.

Housing 10 serves as a container for the device. The material used in the construction of housing 10 is not critical to its operation. Depending upon the pressure and temperature of the liquid flowing through housing 10, it can be constructed of steel or aluminum alloys where strength is needed, or can alternately be made from tubing or hose produced from resins or rubber.

The present device is capable of dampening liquid pulsations without introducing substantial back pressure in the liquid system. This can be achieved by dimensioning the housing 10, tube 12, fin 17, and the apertures 21 so that movement of liquid between the ports 18 and 20 approaches a free-flow condition with minimal back pressure. No restriction of fluid flow is required through the device for successful operation.

It has been found that the longitudinal length of the device affects the degree of dampening of liquid pulsations. The amount of dampening is proportional to the total longitudinal length of the device. However, since liquid pulsations are transmitted in an enclosed liquid system without substantial modification, two or more devices can be arranged in series to provide dampening characteristics essentially identical to those of a single device having their combined length.

When using the device, it is important that the direction of fluid flow be such that the travelling pulsations be directed first in a helical path about the fin 17 and subsequently be reversed axially through the interior of tube 12, independently of the direction of fluid flow. This is true whether the device is interposed downstream or upstream of the source of pulsations, such as the operational pump 25 shown in FIG. 1. If the device is interposed in a liquid system in a reversed condition where pulsations from a source are first directed to the port 20, the pulsations or vibrations in the liquid will be increased in amplitude, since the device then operates as an amplifier or resonator.

Figure 7:
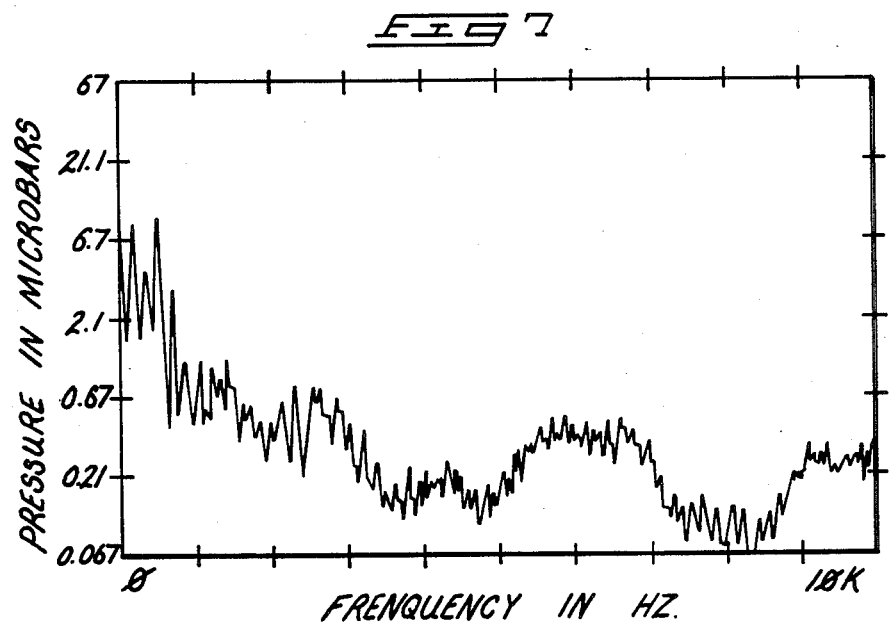
FIG. 7 is a plot of pulsation amplitude and frequency at the inlet of the device.
Figure 8:
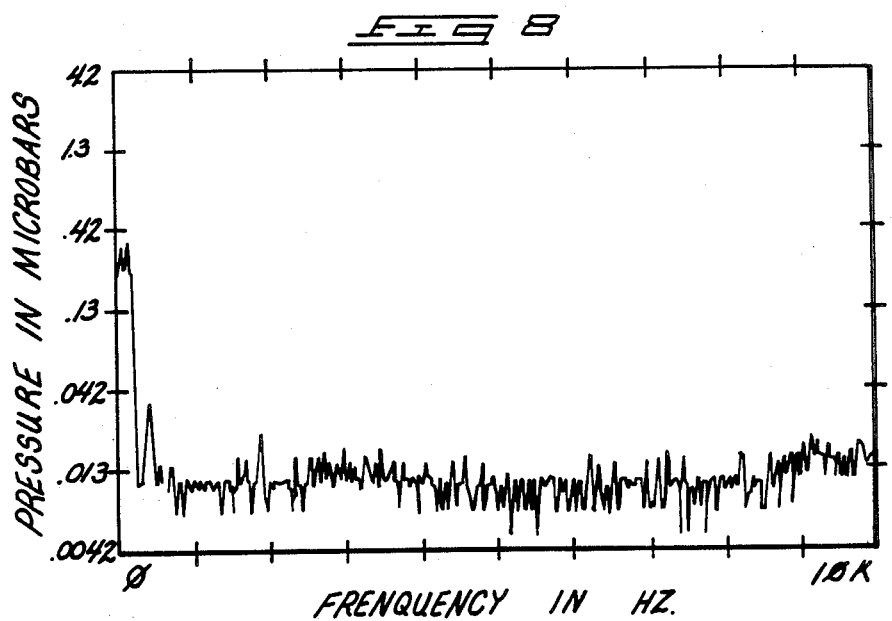
FIG. 8 is a plot of pulsation amplitude and frequency at the outlet of the device.

FIGS. 7 and 8 illustrate actual results achieved by use of a device constructed as shown in the drawings. FIG. 7 shows a plot of liquid pressure (in microbars) versus frequency over a range extending to ten kilohertz. These readings, taken at the inlet of the device, ranged from approximately 0.67 microbars to 0.067 microbars, if one disregards the higher readings at the lefthand side of the diagram, which reflect startup conditions.

FIG. 8 is a similar plot of readings taken at the outlet of the device. Discounting the aberrations that occur during startup, the amplitude of the vibrations are seen to be substantially reduced, and are confined within a much more narrow range below 0.42 microbars and above 0.0042 microbars. Further development of this apparatus since the tests evidenced by FIGS. 7 and 8 has resulted in even greater dampening by extending the length of the device and by connecting two devices in series. When two devices are connected in series, there are substantial differences in pulsation amplitude between the inlet and outlet ports of each device.

While the housing 10 and tube 12 have been described as being "cylindrical," it is to be understood that this does not eliminate the possibility of one or both being tapered from one end to the other. A taper might be useful for casting or fabrication purposes, and might also be useful in reducing back pressure by gradually increasing the cross sectional area of the fluid path as it winds helically about the tube 12.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A liquid pulsation dampening device, comprising:
   a housing having a continuous cylindrical inner wall surface formed about a central longitudinal axis;
   two end walls respectively sealed across the cylindrical inner wall surface of the housing at positions spaced longitudinally apart from one another along the axis;
   a coaxial hollow longitudinal tube located within the housing, the tube having continuous inner and outer surfaces extending beween the two end walls, the outer surface defining a space separating it from the cylindrical inner wall surface of the housing;
   a continuous helical fin formed integrally about the outer surface of the tube with the fin being extended radially outward to the cylindrical inner wall surface of the housing;
   first port means leading between the inner wall surface of the housing and the outer surface of the tube for connection to a conduit adapted to lead to a source of liquid pulsations,
   passage means for transferring liquid between the space separating the inner wall surface of the housing and the outer surface of the tube and the interior of the tube, the passage means being positioned at a single general location along the central longitudinal axis, the passage means being longitudinally spaced from the location of the first port means;
   second port means leading into the interior of the tube for connection to a conduit adapted to lead away from the source of liquid pulsations; and
   the first port means, passage means, and second port means defining a flow path through which substantially all of the liquid entering and exiting the dampening device is caused to flow whereby liquid pulsations are dampened as a result of such flow.

2. The liquid pulsation dampening device of claim 1 wherein the second port means is formed through one of the end walls.

3. The liquid pulsation dampening device of claim 1 wherein the second port means is formed through one of the end walls;
   the first port means being formed through the cylindrical inner wall surface of the housing at a location inwardly adjacent to the one end wall 4. The liquid pulsation dampening device of claim 1 wherein the second port means is formed through one of the end walls;
   the first port means being formed through the cylindrical inner wall surface of the housing at a location inwardly adjacent to the one end wall; and
   the passage means being formed through the inner and outer surfaces of the tube at a location that is inwardly adjacent to the remaining end wall.

5. The liquid pulsation dampening device of claim 1 wherein the housing comprises a generally hollow cylinder open at its ends, the two end walls being joined to the tube across opposite ends thereof, and
   means for sealingly engaging the two end walls within the generally hollow cylinder.

6. A liquid pulsation dampening device, comprising:
   a hollow cylindrical housing having a continuous cylindrical inner wall surface formed coaxially about a central longitudinal axis;
   a hollow longitudinal tube coaxially positioned within the housing, the hollow tube having continuous cylindrical walls with inner and outer surfaces extending between first and second longitudinal ends of the tube and defining an annular space separating the housing and tube;
   two transverse end walls sealed across the inner wall surface of the housing and closing off the respective ends of the tube;
   a continuous helical fin formed integrally about the outer surface of the cylindrical walls of the tube, the fin being extended radially across the space separating the tube and housing to a location inwardly adjacent to the inner wall surface of the housing and being extended longitudinally from one end wall to the other;
   first port means leading to the space separating the cylindrical inner wall surface of the housing and the outer surface of the tube for connection to a conduit adapted to lead to a source of liquid pulsations,
   passage means for transferring liquid between the space separating the cylindrical inner wall surface of the housing and the outer surface of the tube and the interior of the tube, the passage means being positioned at a single general location along the axis which is longitudinally spaced from the location of the first port means;

second port means leading into the interior of the tube for connection to a conduit adapted to lead away from the source of liquid pulsations; and the first port means, passage means, and second port means defining a flow path through which substantially all of the liquid entering and exiting the dampening device is caused to flow whereby liquid pulsations are dampened as a result of such flow.

7. The liquid pulsation dampening device of claim 6, wherein the housing comprises a generally hollow cylinder open at its ends, the end walls being joined with the tube across opposite ends thereof, and means for sealingly engaging the two end walls within the generally hollow cylinder.

8. The liquid pulsation dampening device of claim 6, wherein the end walls are formed integrally with the tube; and resilient sealing means interposed between the end walls and the inner wall surface of the housing.

9. The liquid pulsation dampening device of claim 6 wherein the second port means is formed through one of the end walls.

10. The liquid pulsation dampening device of claim 6 wherein the second port means is formed through one of the end walls;

the first port means being formed through the cylindrical inner wall surface of the housing at a location inwardly adjacent to the one end wall.

11. The liquid pulsation dampening device of claim 6 wherein the second port means is formed through one of the end walls;

the first port means being formed through the cylindrical inner wall surface of the housing at a location inwardly adjacent to the one end wall; and the passage means being formed through the inner and outer surfaces of the tube at a location that is inwardly adjacent to the remaining end wall.

12. The liquid pulsation dampening device of claim 6 wherein the second port means is formed through one of the end walls;

the first port means being formed through the cylindrical inner wall surface of the housing at a location inwardly adjacent to the one end wall;

the passage means being a plurality of openings formed through the tube, the openings being angularly spaced about the central axis at a location that is inwardly adjacent to the remaining end wall.

13. The liquid pulsation dampening device of claim 6 wherein the tube and fins are constructed of a metal having substantial sound transmitting capability.

14. The liquid pulsation dampening device of claim 6 wherein the relative dimensions of the housing, tube, and liquid passage means are such that movement of liquid between the first and second port means approaches a free-flow condition with minimal back pressure.

* * * * *